A. B. SMITH.
Evaporating Pan.

No. 68,125.

Patented Aug. 27, 1867.

WITNESSES:

INVENTOR:

United States Patent Office.

A. B. SMITH, OF CLINTON, PENNSYLVANIA.

Letters Patent No. 68,125, dated August 27, 1867.

---

IMPROVED SORGHUM-SUGAR EVAPORATOR.

---

*The Schedule referred to in these Letters Patent and making part of the same.*

---

TO ALL WHOM IT MAY CONCERN:

Be it known that I, A. B. SMITH, of Clinton, in the county of Allegheny, and State of Pennsylvania, have invented an Improved Sugar-Evaporator; and I do hereby declare that the following is a full and exact description thereof, reference being had to the accompanying drawings, making part of this specification—

Figure 1:
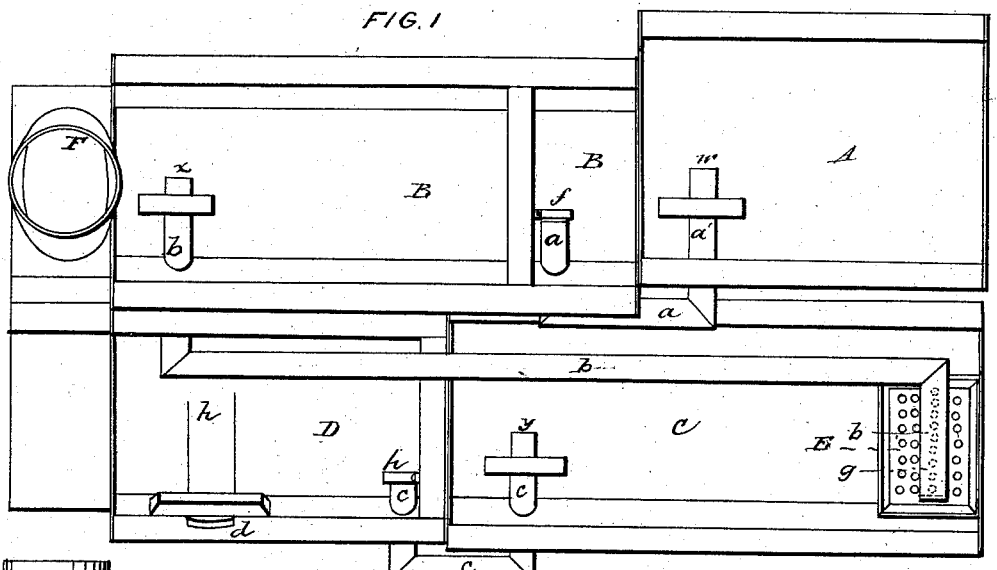
Figure 2:
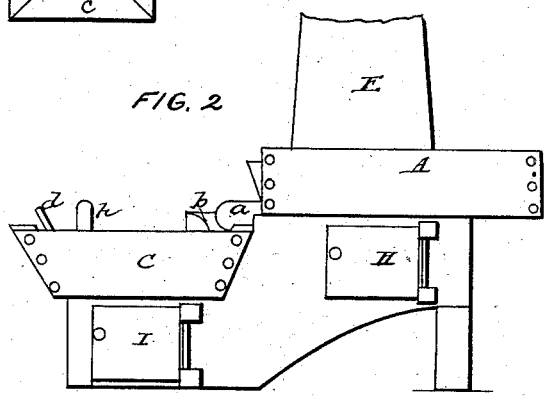
Figure 3:
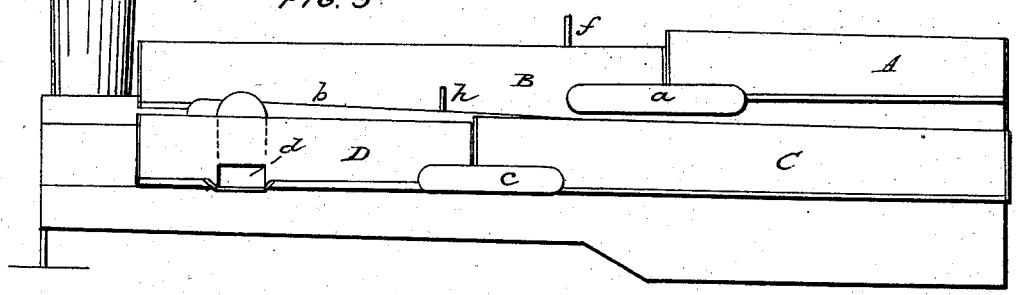

Figure 1 being a top view of the evaporator.
Figure 2, a front-end view of the same.
Figure 3, a side view thereof.
Like letters designate corresponding parts in all of the figures.

In the arrangement represented, I employ four evaporating-pans A B C D, the two former being placed a foot, more or less, higher than the two latter, and over a furnace, H, separate from the furnace I, over which the latter are placed. The furnaces may be constructed of brick or iron, and have flues leading to one smoke pipe, F. The pan A is higher than the pan B, and the pan C is higher than the pan D, so that the sirup will flow successively from one pan to the other. A tube or pipe, $a$, conducts the sirup from A to B, a pipe, $b$, from B to C, and a pipe, $c$, from C to D. The sirup is finally drawn from the pan D through a gate or spigot, $d$. The inwardly projecting ends of the pipes $a$, $b$, and $c$ may be fixed permanently in position, but the connecting portions should be removable, so that the pans may be separated at pleasure. The inner ends of the pipes, where they receive the sirup from the respective pans, extend into the middle parts thereof, at the bottom, so that they take the sirup where there is the greatest heat and most ebullition. The object of this is to avoid conducting the scum away, for I find, since the scum gathers where there is least ebullition and commotion, that by thus locating the induction ends of the pipe, as at $w$, $x$, $y$, fig. 1, no scum will pass into the pipes, and I thus gain a very important advantage. The outlet trough or spout in the pan D also draws from the middle thereof, as at the point $z$. It is not necessary that these points of drawing off should be exactly central, but near enough to the centre line, from side to side, to effect the purpose which I aim to accomplish, as herein specified. The long pipe $b$, which conducts the sirup from the rear end of the rear pan B to the front end of the front pan C, has its forward end adjustable, or free to be moved up or down, and thus regulate the flow of the sirup as desired. The sirup is discharged from the pipe $b$ through small orifices in the lower side, as indicated by dotted lines at $g$, fig. 1. The sirup is thereby distributed over the filtering-pan E, underneath, which is filled with animal charcoal or other suitable filtering and purifying material. The pipes $a$ $c$ have valves $f$ $h$ respectively at their lower or discharge ends, substantially as represented. They serve not only to regulate the flow of the sirup from one pan to another, but they keep the pipes full of sirup, and thus prevent the burning of the sirup therein.

What I claim as my invention, and desire to secure by Letters Patent, is—

The arrangement of the transferring pipes $a$ $b$ $c$, in connection with the evaporating-pans, so as to draw the sirup from the middle thereof, or where the greater ebullition takes place therein, for the purpose herein specified.

I also claim the adjustable transferring pipe $b$, arranged substantially as and for the purpose herein set forth.

I also claim the valves $f$ $h$, applied to the pipes $a$ $c$, for the purpose herein set forth.

I also claim the combination and arrangement of the filtering-pan E and pipe $b$, substantially as herein specified.

The above specification of my improved sugar-evaporator signed by me this 8th day of March, 1867.

A. B. SMITH.

Witnesses:
LEONARD S. JOHNS,
J. S. BROWN.